(12) United States Patent
Lu et al.

(10) Patent No.: US 12,153,264 B2
(45) Date of Patent: Nov. 26, 2024

(54) MULTI-FIBER FERRULE ASSEMBLY AND MEASUREMENT METHODS

(71) Applicant: COMMSCOPE TECHNOLOGIES LLC, Hickory, NC (US)

(72) Inventors: Yu Lu, Eden Prairie, MN (US); Levi T. Merrick, Bloomington, MN (US); Scott E. Eischens, Bloomington, MN (US)

(73) Assignee: CommScope Technologies LLC, Hickory, NC (US)

( * ) Notice: Subject to any disclaimer, the term of this patent is extended or adjusted under 35 U.S.C. 154(b) by 384 days.

(21) Appl. No.: 17/425,695

(22) PCT Filed: Jan. 24, 2020

(86) PCT No.: PCT/US2020/014920
§ 371 (c)(1),
(2) Date: Jul. 23, 2021

(87) PCT Pub. No.: WO2020/154577
PCT Pub. Date: Jul. 30, 2020

(65) Prior Publication Data
US 2022/0120979 A1    Apr. 21, 2022

Related U.S. Application Data

(60) Provisional application No. 62/796,467, filed on Jan. 24, 2019, provisional application No. 62/849,667, filed on May 17, 2019.

(51) Int. Cl.
*G02B 6/38* (2006.01)
*G01B 21/10* (2006.01)

(52) U.S. Cl.
CPC ......... *G02B 6/3885* (2013.01); *G02B 6/3822* (2013.01); *G02B 6/3833* (2013.01);
(Continued)

(58) Field of Classification Search
CPC .. G02B 6/3843; G02B 6/3885; G02B 6/3861; G02B 6/3833
See application file for complete search history.

(56) References Cited

U.S. PATENT DOCUMENTS 5,214,730 A * 5/1993 Nagasawa ............. G02B 6/389
385/71
6,085,003 A    7/2000 Knight
(Continued)

FOREIGN PATENT DOCUMENTS

EP          938003 A1 * 8/1999 ............. G02B 6/383
JP          3654439 B2   3/2005
(Continued)

OTHER PUBLICATIONS

International Search Report and Written Opinion of the International Searching Authority for International Patent Application No. PCT/US2020/014920 mailed May 26, 2020, 8 pages.
(Continued)

*Primary Examiner* — Michelle R Connelly
(74) *Attorney, Agent, or Firm* — Merchant & Gould P.C.

(57) ABSTRACT

The present disclosure relates to a ferrule assembly including a ferrule defining a row of fiber openings. Optical fibers are secured within the fiber openings. The optical fibers are offset within the fiber openings toward one side of the ferrule.

4 Claims, 7 Drawing Sheets

(52) U.S. Cl.
CPC ......... *G02B 6/3861* (2013.01); *G02B 6/3882* (2013.01); *G01B 21/10* (2013.01); *G02B 6/385* (2013.01)

(56) References Cited

U.S. PATENT DOCUMENTS

| | | |
|---|---|---|
| 6,371,658 B2 | 4/2002 | Chong |
| 6,742,936 B1 | 6/2004 | Knecht et al. |
| 8,684,611 B2 | 4/2014 | Childers et al. |
| 9,810,851 B2 | 11/2017 | Lu |
| 2016/0341909 A1 | 11/2016 | Childers et al. |
| 2017/0341972 A1 | 11/2017 | Bookbinder et al. |
| 2018/0329156 A1 | 11/2018 | Flaig et al. |

FOREIGN PATENT DOCUMENTS

| | | |
|---|---|---|
| JP | 3660033 B2 | 6/2005 |
| JP | 2005-316008 A | 11/2005 |
| KR | 10-2018-0007156 A | 1/2018 |

OTHER PUBLICATIONS

Extended European Search Report for Application No. 20745972.8 mailed Jan. 19, 2023.

* cited by examiner

MULTI-FIBER FERRULE ASSEMBLY AND MEASUREMENT METHODS

CROSS-REFERENCE TO RELATED APPLICATIONS

This application is a National Stage Application of PCT/US2020/014920, filed on Jan. 24, 2020, which claims the benefit of U.S. Patent Application Ser. No. 62/796,467, filed on Jan. 24, 2019, and claims the benefit of U.S. Patent Application Ser. No. 62/849,667, filed on May 17, 2019, the disclosures of which are incorporated herein by reference in their entireties. To the extent appropriate, a claim of priority is made to each of the above disclosed applications.

TECHNICAL FIELD

The present disclosure relates generally to fiber optic connectors. More particularly, the present disclosure relates to multi-fiber ferrules for multi-fiber optical connectors and to measurement methods.

BACKGROUND

A multi-fiber optical connector, for example an MPO connector, typically includes a connector housing supporting a multi-fiber ferrule (e.g., an MT ferrule) at a distal end and a connector boot at a proximal end. A multi-fiber ferrule typically has an end face at which optical fibers are presented for optical connection to optical fibers of another multi-fiber ferrule. The end face of a multi-fiber ferrule can be perpendicular relative to a central longitudinal axis of the ferrule, or can be oriented at an oblique angle relative to the central longitudinal axis. Typically, in the case where the end face of the ferrule is obliquely angled, the end face is angled about 8 degrees relative to perpendicular. It will be appreciated that angling the end face can assist in reducing insertion loss. Example multi-fiber optical connectors are disclosed by U.S. Pat. Nos. 5,214,730; 6,085,003; 8,684,611; and 9,810,851.

SUMMARY

Aspects of the present disclosure relate to multi-fiber ferrule configurations adapted to provide enhanced alignment between the optical fibers of first and second ferrules that are coupled together. In certain examples, the optical fibers can be mounted within fiber openings defined by the ferrules that are at least slightly oversized. In certain examples, the optical fibers can be offset toward to a common side of each of the openings. In certain examples, the ferrules can include multi-fiber ferrules having obliquely angled end faces. In certain examples, the use of multi-fiber ferrules having optical fibers offset to one side of each ferrule assists in providing enhanced coaxial alignment of the individual fibers when two angled multi-fiber ferrules are mated together.

Another aspect of the present disclosure relates to a ferrule assembly including a ferrule body having a front end and a rear end. The front end defines a front end face having a major dimension and a minor dimension. The major and minor dimensions are oriented perpendicular relative to one another. The ferrule body defines a plurality of fiber openings that extend through the ferrule body along a rear-to-front axis of the ferrule body. The fiber openings are arranged in a row that extends along the major dimension. The fiber openings each have an opening center point. The ferrule assembly also includes optical fibers adhesively secured within the fiber openings. The optical fibers each have a fiber center point. The optical fibers are secured within the fiber openings such that, adjacent the front end face of the ferrule body, the fiber center points are offset from the opening center points in an offset orientation that extends along the minor dimension. The fiber center points of all the optical fibers secured within the row of fiber openings are offset in a common direction along the offset orientation with respect to the opening center points of their respective fiber openings. The front end face is preferably angled at a non-perpendicular angle relative to the rear-to-front axis, but could also be perpendicular.

Another aspect of the present disclosure relates to a ferrule assembly including a ferrule body including a front end and a rear end. The front end defines a front end face having a major dimension and a minor dimension. The major and minor dimensions are oriented perpendicular relative to one another. The ferrule body defines a plurality of fiber openings that extend through the ferrule body along a rear-to-front axis of the ferrule body. The fiber openings are arranged in a row that extends along the major dimension. Fiber openings each have an opening center point. The opening center points are aligned generally along a reference line that extends along the major dimension. The reference line divides each of the fiber openings into a first opening side positioned on one side of the reference line and a second opening side positioned on an opposite side of the reference line. The front end face is angled at a non-perpendicular angle relative to the rear-to-front axis. The ferrule assembly further includes optical fibers adhesively secured within the fiber openings. The optical fibers each have a fiber center point. All of the optical fibers are secured within the fiber openings of the row such that, adjacent the front end face of the ferrule body, the fiber center points are offset from the opening center points in an offset direction that extends toward the first opening sides of the fiber openings.

Another aspect of the present disclosure relates to a method for generating data representative of a size characteristic of a fiber opening in a ferrule. The method includes positioning an optical fiber at a first position within the fiber opening in which the optical fiber engages an opening defining portion of the ferrule at a first contact location, and measuring a first distance between a first reference location moveable with the optical fiber and a second reference location not moveable with the optical fiber. The method also includes positioning the optical fiber at a second fiber position within the fiber opening in which the optical fiber engages the opening defining portion of the ferrule at a second contact location, and measuring a second distance between the first reference location moveable with the optical fiber and the second reference location. The first and second contact locations are on diametrically opposite sides of the fiber opening.

Another aspect of the present disclosure relates to a method for measuring a diameter of a fiber opening in a ferrule. The method includes positioning an optical fiber at a first position within the fiber opening in which the optical fiber engages an opening defining portion of the ferrule at a first contact location, and measuring a first distance between a first reference location moveable with the optical fiber and a second reference location not moveable with the optical fiber. The method also includes positioning the optical fiber at a second fiber position within the fiber opening in which the optical fiber engages the opening defining portion of the ferrule at a second contact location, and measuring a second distance between the first reference location moveable with the optical fiber and the second reference location. The first and second contact locations are on diametrically opposite sides of the fiber opening. The method further includes measuring a diameter of the optical fiber, and determining the diameter of the fiber opening by adding the first and second distances to the diameter of the optical fiber.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
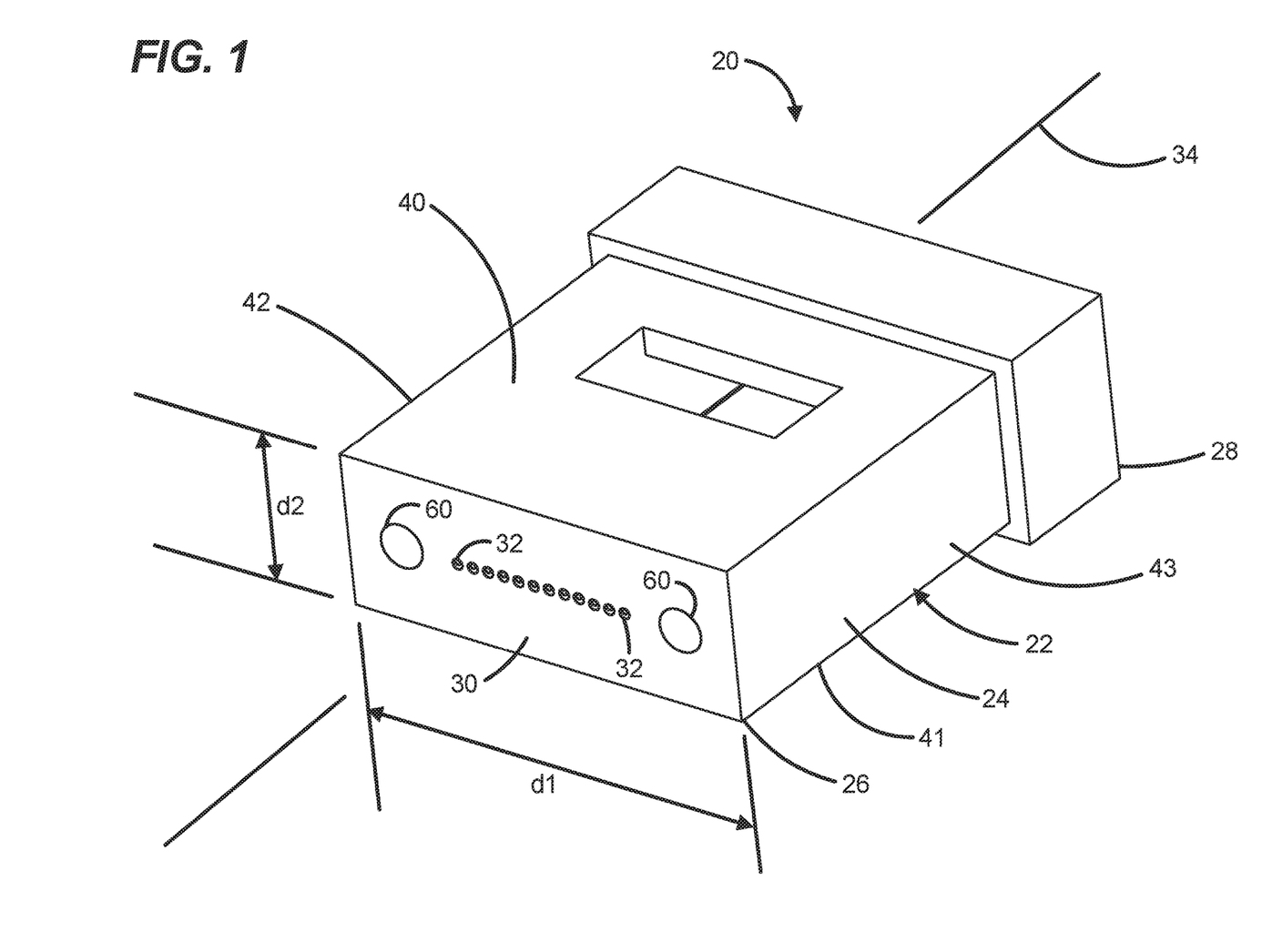
FIG. 1 is a perspective view of a multi-fiber ferrule in accordance with the principles of the present disclosure.

FIG. 1 depicts a multi-fiber ferrule assembly 20 in accordance with the principles of the present disclosure. The multi-fiber ferrule assembly 20 includes a ferrule 22 (e.g., an MT ferrule) having a ferrule body 24. The ferrule body 24 includes a front end 26 and a rear end 28. The front end 26 defines a front end face 30 having a major dimension d1 and a minor dimension d2. The major and minor dimensions d1, d2 are oriented perpendicular relative to one another.

Figure 2:
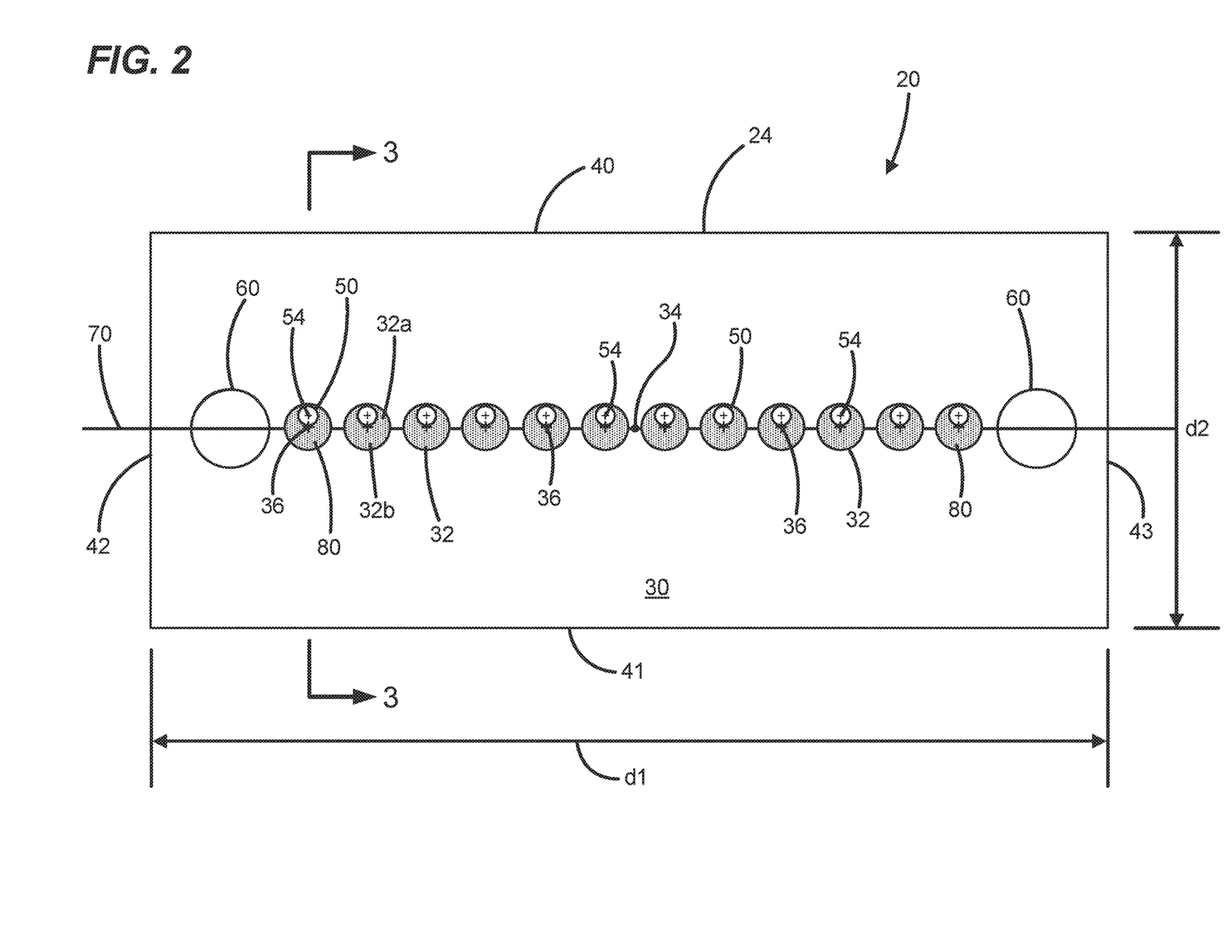
FIG. 2 is a front view of the multi-fiber ferrule of FIG. 1.
Figure 3:
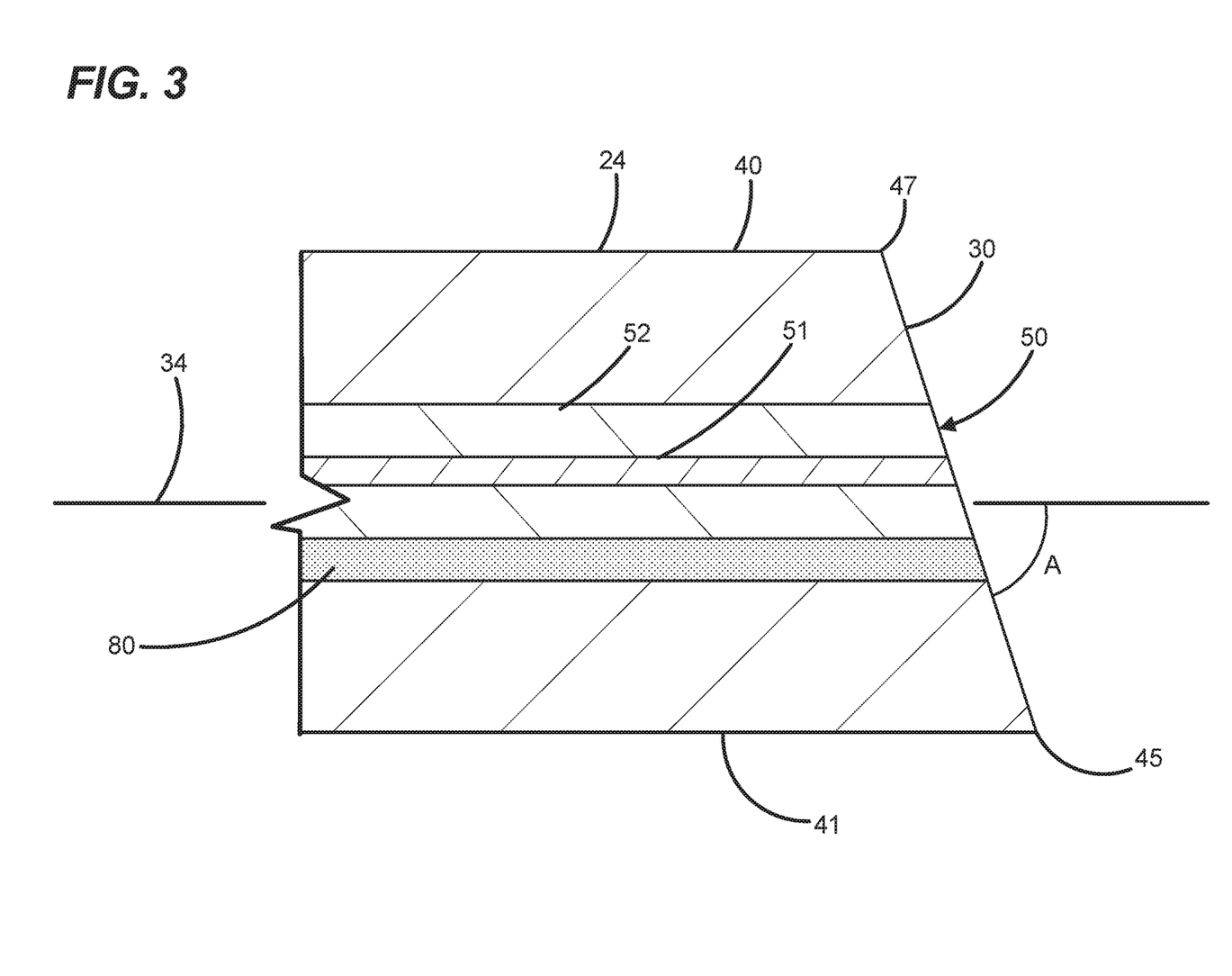
FIG. 3 is a cross-sectional view taken along section line 3-3 of FIG. 2.

Referring to FIGS. 1-3, the ferrule body 24 defines a plurality of fiber openings 32 that extend through the ferrule body 24 along a rear-to-front axis 34 of the ferrule body 24. The fiber openings 32 are arranged in a row that extends along the major dimension d1. As shown at FIG. 2, each of the fiber openings 32 includes an opening center point 36.

As best shown at FIG. 3, the front end face 30 is oriented at an angle A relative to the rear-to-front axis 34. The angle A is preferably an oblique angle. In certain examples, the angle A is in the range of 80 to 84 degrees. In a preferred example, the angle A is 82 degrees. Thus, in certain examples, the front end face 30 is angled about 8 degrees relative to a plane that is perpendicular to the rear-to-front axis 34.

Referring to FIG. 1, the ferrule body 24 includes opposite major sides 40, 41 and opposite minor sides 42, 43. The major sides 40, 41 extend between the minor sides 42, 43. The angling of the front end face 30 causes the ferrule body 24 to have a forward edge 45 at the major side 41, and a rearward edge 47 at the major side 41. It will be appreciated that the angle A is visible when viewed in a direction along the major dimension d1 as shown at FIG. 3.

Referring to FIGS. 1-3, the multi-fiber ferrule assembly 20 further includes optical fibers 50 adhesively secured within the fiber openings 32 by an adhesive 80 such as epoxy. The fiber openings 32 are depicted as being significantly oversized with respect to the optical fibers 50. In this regard, it will be appreciated that the oversized nature of the fiber openings 32 relative to the optical fibers 50 has been greatly exaggerated to better illustrate aspects of the present disclosure. For certain examples, front ties of the fibers 50 can project forwardly from the front end face 30.

It will be appreciated that the multi-fiber ferrule assembly 20 is adapted to be installed within a multi-fiber connector. In this regard, a suitable multi-fiber fiber optic connector (e.g., an MPO connector) is depicted by U.S. Pat. No. 9,810,851, which is hereby incorporated by reference in its entirety.

It will be appreciated that the multi-fiber ferrule assembly 20 can include structure for facilitating aligning two multi-fiber ferrule assemblies to provide an optical connection between the optical fibers supported by the assemblies. In this regard, multi-fiber ferrule assembly 20 can include alignment structures such as alignment pin openings 60 for receiving alignment pins of a corresponding multi-fiber ferrule to which it is desired to be optically coupled. Thus, the multi-fiber ferrule 22 of FIG. 2 is a female ferrule having alignment pin openings 60 spaced apart from one another along the major dimension d1. In other examples, the multi-fiber ferrule 22 can be a male multi-fiber ferrule in which alignment pins are positioned at the locations of the alignment pin openings 60. Such alignment pins are adapted to project forwardly from the front end face 30.

Referring again to FIGS. 2 and 3, the optical fibers 50 are preferably bare-fibers and include a central core 51 surrounded by a cladding layer 52. The cladding layer 52 is preferably engaged by bonding material securing the optical fibers 50 within the fiber openings 32. Each of the optical fibers 50 includes a fiber center point 54. The optical fibers 50 are secured within the fiber openings 32 such that, adjacent to the front end face 30 of the ferrule body 24, the fiber center points 54 are offset from the opening center points 36 in an offset direction that extends along the minor dimension d2. The fiber center points 54 of all the optical fibers 50 secured within the row of fiber openings 32 are offset in a common direction (e.g., upwardly as shown at FIG. 2) along the offset orientation (e.g., along the minor dimension d2) with respect to the opening center points 36 of their respective fiber openings 32. Described another way, the opening center points 36 are aligned generally along a reference line 70 that extends along the major dimension d1 and divides each of the fiber openings 32 into a first opening side 32a positioned one side of the reference line 70 and a second opening side 32b on an opposite side of the reference line 70, and all of the optical fibers 50 are secured within the fiber openings 32 such that, at least adjacent to the front end face 30 of the ferrule body 24, the fiber center points 54 are offset from the openings center points 36 in an offset direction that extends toward the first opening sides 32a of the fiber openings 32.

Figure 4:
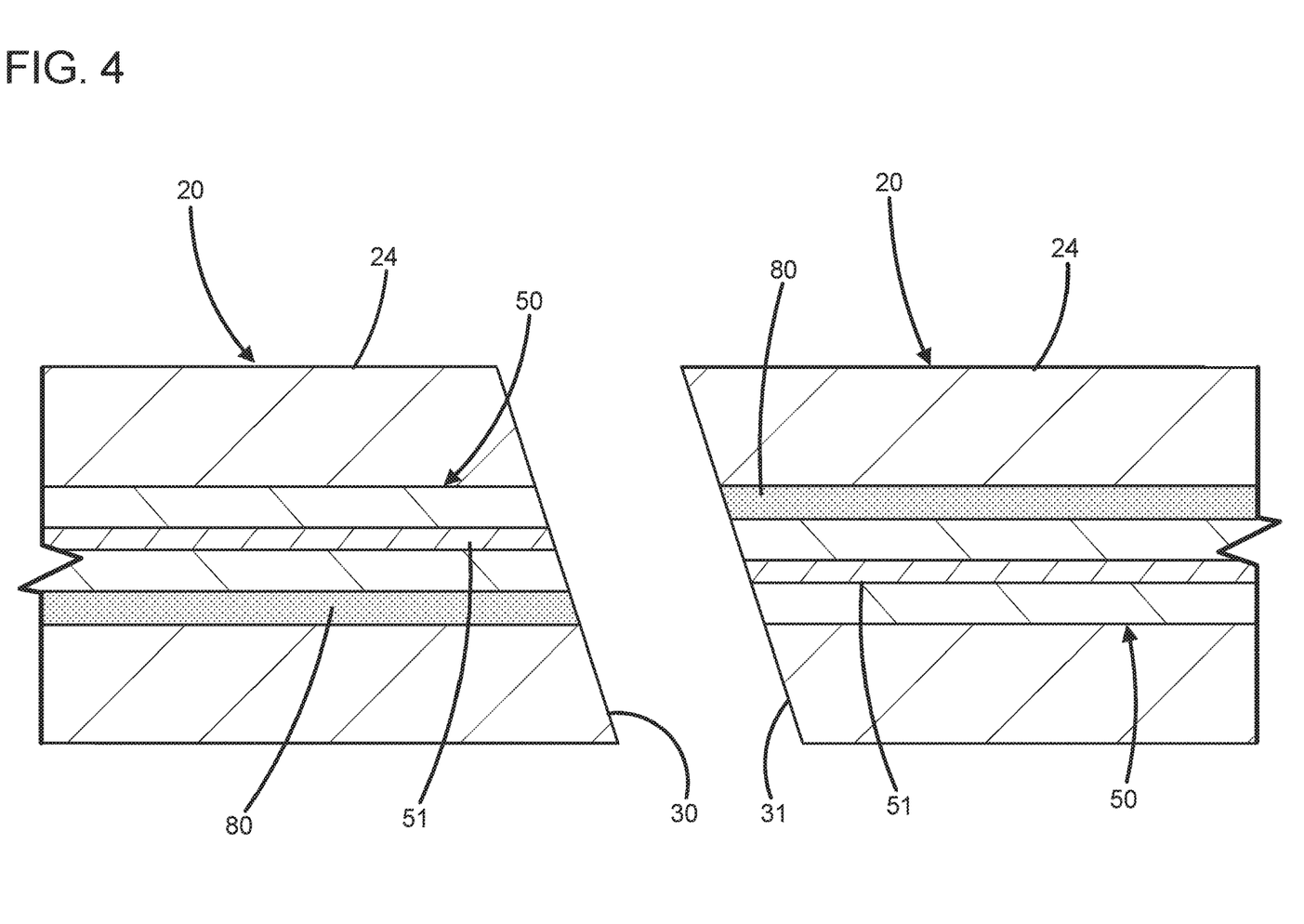
FIG. 4 shows two ferrules in the process of being coupled together.
Figure 5:
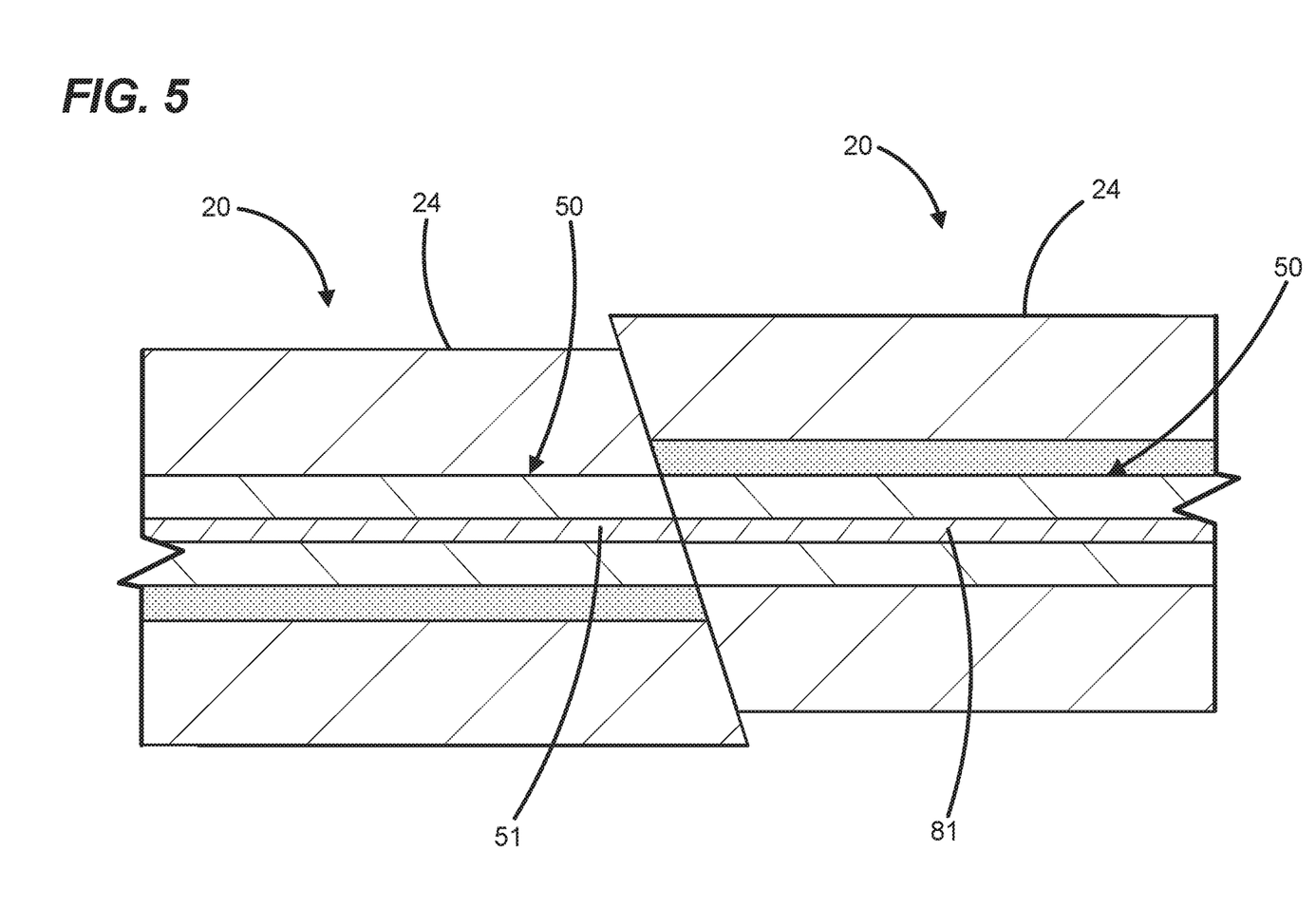
FIG. 5 shows ferrules of FIG. 4 after abutment and sliding of the ferrules has occurred, it will be appreciated that the sliding has been depicted in greatly exaggerated form for illustration purposes.

When two of the multi-fiber ferrule assemblies 20 (e.g., a male multi-fiber ferrule assembly and a female multi-fiber ferrule assembly) are mated together, the angled end faces oppose and are generally parallel to one another as shown at FIG. 4. Abutment between the end faces 30 causes slight sliding between the end faces 30 as shown at FIG. 5 in an exaggerated manner. As shown at FIG. 5, it will be appreciated that by selectively offsetting the optical fibers within the fiber openings 32 as described above, the optical fibers are brought into better axial alignment after sliding of the ferrules 24 as compared to if no offset had been present. It will be appreciated that the quality of the optical connection between the optical fibers of the mated multi-fiber ferrule assemblies 20 is dependent upon precise coaxial alignment of the individual fibers. Thus, by offsetting the fibers to compensate for sliding that occurs between the ferrules during mating, better fiber alignment and better performance can be obtained.

It will be appreciated that the multi-fiber ferrule assembly 20 can be made by initially inserting the optical fibers 50 into the fiber openings 32. Next, the optical fibers 50 offset to one side of the openings (e.g., the optical fibers 50 are offset to a common side of the fiber openings 32). In other words, all of the optical fibers 50 are moved within their responding fiber openings 32 toward one of the major sides 40, 41 of the ferrule 22. Once the optical fibers 50 have been offset in their corresponding openings 32 toward one side of the ferrule 22, the optical fibers 50 are adhesively secured in the fiber openings 32 so as to lock the optical fibers 50 in the offset orientation within the ferrule 22. The fibers can be offset to a common side of each of the fiber openings by applying biasing forces to the optical fibers in the same direction to force the optical fibers to move all in the same direction within their respective fiber openings toward the common sides of the openings. With the biasing forces applied to the optical fibers to temporarily maintain the optical fibers in the offset positions, adhesive can be used to permanently fix the optical fibers in the offset positions.

Aspects of the present disclosure are applicable to multi-fiber ferrules including multi-fiber ferrules with obliquely angled end faces and multi-fiber ferrules having perpendicular end faces.

Aspects of the present disclosure also relate to methods for generating data representative of a size characteristic of a fiber opening in a ferrule. In one example, the size characteristic of the fiber opening in the ferrule can include a diameter of the fiber opening. It will be appreciated that methods in accordance with the principles of the present disclosure can be used for generating data representative of a size characteristic of a fiber opening in a single-fiber ferrule as well as in multi-fiber ferrules.

Figure 6:
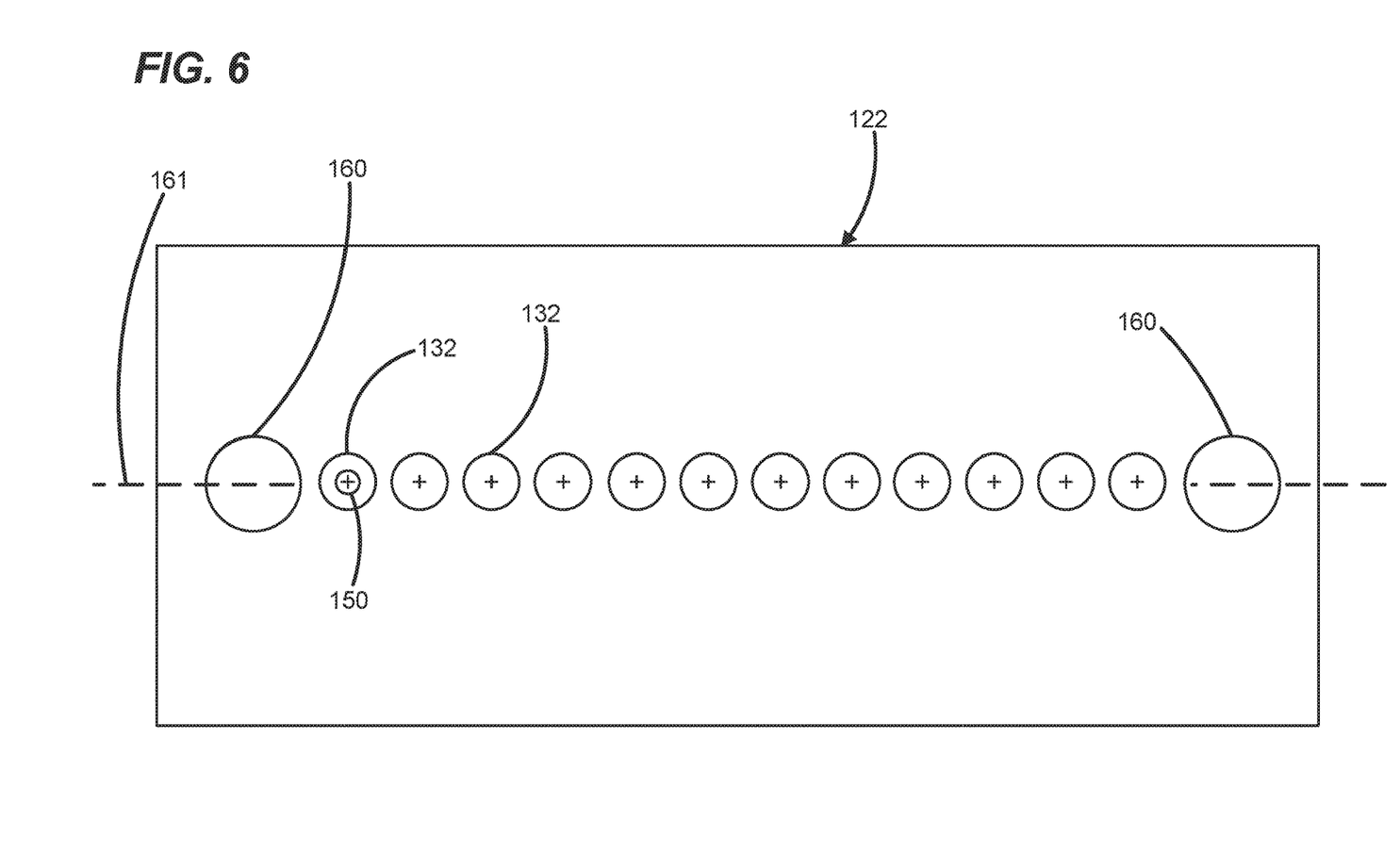
FIG. 6 depicts a front face of a multi-fiber ferrule having a row of fiber openings, an optical fiber is shown positioned within one of the fiber openings.

FIG. 6 depicts an end face of a multi-fiber ferrule 122 having a row of fiber openings 132 positioned between two alignment pin openings 160. The fiber openings 132 are shown positioned along a reference line 161 that bisects the alignment pin openings 160 and extends across the fiber openings 132. An optical fiber 150 is depicted within one of the fiber openings 132. The difference in size between the optical fiber 150 and its corresponding fiber opening 132 is greatly exaggerated for the purpose of their illustrating methods in accordance with the principles of the present disclosure.

Figure 7:
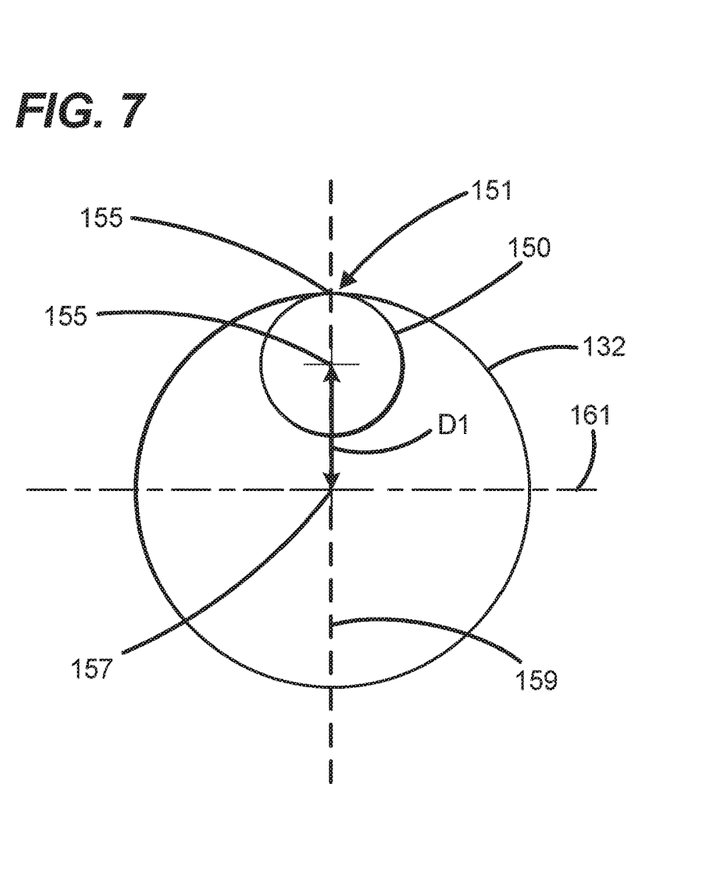
FIG. 7 is an enlarged view of the fiber opening of FIG. 6 which contains the optical fiber, the optical fiber is shown moved to one side of the opening.

Pursuant to methods in accordance with the principles of the present disclosure, the optical fiber 150 can be used to generate data representative of a size characteristic of the fiber opening 132. In one example, the data representative of a size characteristic of the fiber opening 132 can include a diameter of the fiber opening 132. Pursuant to a method in accordance with the principles of the present disclosure, optical fiber 150 can be positioned at a first fiber position 151 within the fiber opening 132 (see FIG. 7). When the optical fiber 150 is positioned at the first fiber position 151, the optical fiber 150 engages an opening-defining portion of the ferrule 122 at a first contact location 153. With the optical fiber 150 in the first fiber position 151, a first distance D1 is measured between a first reference location 155 movable with the optical fiber 150 and a second reference location 157 that is not movable with the optical fiber 150. In the depicted example, the first reference location 155 is at a center of a core of the optical fiber 150. The second reference location 157 preferably corresponds to a feature of the ferrule and is not movable with the optical fiber 150. In the depicted example, the second reference location 157 is located on the reference line 161. As will be described later in the specification, the second reference location 157 can be provided at an intersection point between the reference line 161 and a reference line 159 that is perpendicular with respect to the reference line 161.

Figure 8:
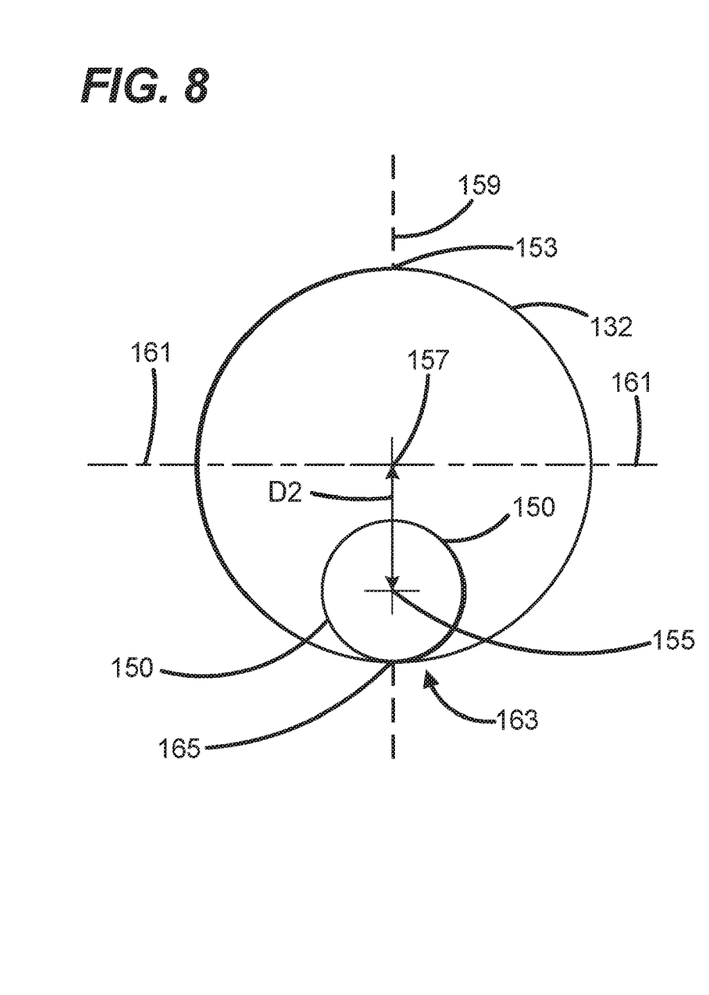
FIG. 8 is an enlarged view of the fiber opening of FIG. 6 which contains the optical fiber, the optical fiber is shown moved to a side of the opening opposite from the side at which the fiber is positioned as shown at FIG. 7.

Referring to FIG. 8, the method also includes positioning the optical fiber 150 at a second fiber position 163 within the fiber opening 132. With the optical fiber 150 at the second fiber position 163, the optical fiber engages the opening-defining portion of the ferrule 122 at a second contact location 165. The first and second contact locations 153, 165 are positioned on diametrically opposite sides of the fiber opening 150. The reference line 159 intersects the first and second contact locations 153, 165. With the optical fiber 150 in the second fiber position 163 of FIG. 8, a second distance D2 is measured between the first reference location 155 movable with the optical fiber and the second reference location 157 that is not movable with the optical fiber 150. A diameter of the optical fiber 150 can also be measured. The diameter of the fiber opening is calculated by adding the first and second distances D1, D2 to the diameter of the optical fiber 150.

The various examples described herein are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A ferrule assembly comprising:
   a first ferrule body and a second ferrule body;
   each of the first and second ferrule bodies including a front end and a rear end, the front end defining a front end face having a major dimension and a minor dimension, the major and minor dimensions being oriented perpendicular relative to one another, the first and second ferrule bodies defining a plurality of fiber openings that extend through the first and second ferrule bodies along a rear-to-front axis of the first and second ferrule bodies, the fiber openings being arranged in a row that extends along the major dimension, the fiber openings each having an opening center point, the front end face being angled at a non-perpendicular angle relative to the rear-to-front axis; and
   optical fibers adhesively secured within the fiber openings, the optical fibers each having a fiber center point, the optical fibers being secured within the fiber openings such that, adjacent the front end face of the first and second ferrule bodies, the fiber center points are offset from the opening center points in an offset orientation that extends along the minor dimension, and wherein the fiber center points of all of the optical fibers secured within the row of fiber openings are offset in a common direction along the offset orientation with respect to the opening center points of their respective fiber openings;

the first and second ferrule bodies configured to abut such that the front end face of the first ferrule body is generally parallel to the front end face of the second ferrule body, the optical fibers being offset in opposite directions when the front end faces of the first and second bodies are parallelly aligned.

2. The ferrule assembly of claim 1, wherein abutment between the front end face of the first ferrule body and the front end face of the second ferrule body causes sliding between the front end faces.

3. The ferrule assembly of claim 2, wherein the sliding between the front end faces causes the optical fibers of the first ferrule body to be brought into alignment with the optical fibers of the second ferrule body.

4. A method for mating the ferrule assembly of claim 2, comprising:

abutting the first ferrule body and the second ferrule body in a first abutted position such that the front end faces are contacting each other and are generally parallel; and sliding the first ferrule body and the second ferrule body along the front end faces to a second abutted position where the second abutted position provides improved optical alignment over the first abutted position.

* * * * *